United States Patent
Qiu et al.

(10) Patent No.: US 11,835,662 B2
(45) Date of Patent: *Dec. 5, 2023

(54) MULTI-BEAM LIDAR SYSTEMS AND METHODS FOR DETECTION USING THE SAME

(71) Applicant: SUTENG INNOVATION TECHNOLOGY CO., LTD., Shenzhen (CN)

(72) Inventors: Chunxin Qiu, Shenzhen (CN); Letian Liu, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 135 days.

This patent is subject to a terminal disclaimer.

(21) Appl. No.: 17/458,393

(22) Filed: Aug. 26, 2021

(65) Prior Publication Data

US 2021/0405169 A1  Dec. 30, 2021

Related U.S. Application Data

(63) Continuation of application No. 16/726,035, filed on Dec. 23, 2019, now Pat. No. 11,125,864, which is a continuation of application No. PCT/CN2019/106273, filed on Sep. 17, 2019.

(30) Foreign Application Priority Data

Sep. 18, 2018 (CN) .......................... 201811085374.2
Sep. 18, 2018 (CN) .......................... 201811086579.2

(51) Int. Cl.
*G01S 7/497* (2006.01)
*G01S 17/931* (2020.01)
*G01S 17/894* (2020.01)
*G01S 7/481* (2006.01)

(52) U.S. Cl.
CPC .......... *G01S 7/4972* (2013.01); *G01S 7/4811* (2013.01); *G01S 17/894* (2020.01); *G01S 17/931* (2020.01)

(58) Field of Classification Search
None
See application file for complete search history.

(56) References Cited

U.S. PATENT DOCUMENTS

2011/0216304 A1*  9/2011  Hall ..................... G01S 17/89
                                              356/4.01
2016/0282453 A1*  9/2016  Pennecot ............. G01S 17/89

* cited by examiner

*Primary Examiner* — Luke D Ratcliffe
(74) *Attorney, Agent, or Firm* — BAYES PLLC

(57) ABSTRACT

The present disclosure provides a multi-beam LiDAR system. The multi-beam LiDAR system includes a transmitter having an array of laser emitters. Each laser emitter is configured to emit a laser beam. The multi-beam LiDAR system also includes a receiver having an array of photodetectors. Each photodetector is configured to receive at least one return beam that is reflected by an object from one of the laser beams. The laser emitter array includes a plurality of laser emitter boards perpendicular to a horizontal plane. Each laser emitter board has a plurality of laser emitters. The plurality of laser emitters in the laser emitter array are staggered along a vertical direction. The photodetector array includes a plurality of columns of photodetectors. One of the laser emitter boards corresponds to one column of photodetectors.

19 Claims, 8 Drawing Sheets

100

MULTI-BEAM LIDAR SYSTEMS AND METHODS FOR DETECTION USING THE SAME

CROSS REFERENCE TO RELATED APPLICATION

This application is continuation of U.S. patent application Ser. No. 16/726,035, filed on Dec. 23, 2019, which is a continuation of International Application No. PCT/CN2019/106273, filed on Sep. 17, 2019, entitled "MULTI-BEAM LIDAR SYSTEMS AND METHODS FOR DETECTION USING THE SAME," which claims priority to Chinese Patent Application No. 201811085374.2, filed on Sep. 18, 2018, and Chinese Patent Application No. 201811086579.2, filed on Sep. 18, 2018, the entire contents of each of which are incorporated by reference.

TECHNICAL FIELD

The present disclosure relates to optical signal detection devices, such as a light detection and ranging (LiDAR) device, and more particularly to LiDAR systems using multi-beam laser emitters for detecting objects in the surrounding environment.

BACKGROUND

Optical sensing systems, such as LiDAR systems, have been widely used in autonomous driving. LiDAR systems are used to detect the position, speed, and even contours of an object in the environment and also to produce high-definition maps. For example, a typical LiDAR system measures a distance to a target by illuminating the target with pulsed laser beams and receiving the reflected pulses with a sensor, such as a photodetector. Differences in the wavelengths, phases, and/or return time of the laser beams can then be used to calculate the distance and to make digital three-dimensional (3D) representations of the target. Because using a laser beam as the incident light can map physical features with high resolution, a LiDAR system is particularly suitable for applications such as sensing in autonomous driving and/or high-definition map surveys.

A LiDAR system normally includes a transmitter that emits pulsed laser beams. The transmitter further has one or more laser emitters. Within the same length or area of the transmitter, the more laser emitters are provided, the more laser beams the LiDAR system emits for scanning, and thus the higher resolution the LiDAR system achieves. As a result, the resolution of the LiDAR system typically depends on the density of the laser emitters provided along a direction or within an area of the transmitter.

Existing multi-beam LiDAR systems, which can emit multiple laser beams simultaneously, includes multiple laser emitters. In order to achieve higher resolution of detection, the conventional wisdom is to mount as many laser emitters as possible. Therefore, the transmitter circuits of the system have grown highly complicated along with the increasing size thereof. Other problems which traditional LiDAR systems suffer from include sophisticated internal structure, high overall weight, and short life cycles.

Embodiments of the present disclosure address the above problems by providing LiDAR systems using multi-beam laser emitters for detecting objects in the surrounding environment, as well as methods using the same.

SUMMARY

Embodiments of the disclosure provide a multi-beam LiDAR system. The multi-beam LiDAR system includes a transmitter having an array of laser emitters. Each laser emitter is configured to emit a laser beam. The multi-beam LiDAR system also includes a receiver having an array of photodetectors. Each photodetector is configured to receive at least one return beam that is reflected by an object from one of the laser beams. The laser emitter array includes a plurality of laser emitter boards perpendicular to a horizontal plane. Each laser emitter board has a plurality of laser emitters. The plurality of laser emitters in the laser emitter array are staggered along a vertical direction. The photodetector array includes a plurality of columns of photodetectors. One of the plurality of the laser emitter boards corresponds to one of the plurality of columns of photodetectors.

Embodiments of the disclosure also provide a method for detection by a multi-beam LiDAR system. The method includes emitting laser beams by a transmitter. The transmitter has an array of laser emitters. The method also includes receiving return beams by a receiver that are reflected by an object from the laser beams. The receiver has an array of photodetectors. The laser emitter array includes a plurality of laser emitter boards perpendicular to a horizontal plane. Each laser emitter board has a plurality of laser emitters. The plurality of laser emitters in the laser emitter array are staggered along a vertical direction. The photodetector array includes a plurality of columns of photodetectors. One of the plurality of laser emitter boards corresponds to one of the plurality of columns of photodetectors.

It is to be understood that both the foregoing general description and the following detailed description are exemplary and explanatory only and are not restrictive of the invention, as claimed.

DETAILED DESCRIPTION

Figure 1:
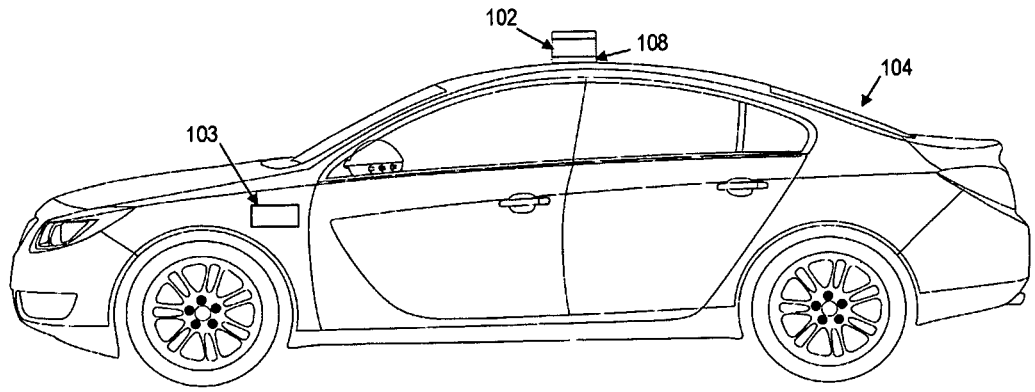
FIG. 1 illustrates a schematic diagram of an exemplary vehicle equipped with a LiDAR system, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

An optical signal detection system, such as a LiDAR system, may use multiple emitters, such as laser emitters, to emit laser beams for detecting objects within the environment surrounding the LiDAR system. For example, laser emitters can emit laser light generated through optical amplification based on simulated emission of electromagnetic radiation, which in turn may correspond to electrical signals, such as current or voltage signals, from another part of the LiDAR system. The laser light may be controlled to emit, often in the form of laser beams, at certain intervals and towards certain directions. Also, the optical signal detection system may use one or more photodetectors to detect optical signals (e.g., laser light) reflected by objects. For example, a photodetector can convert optical signals to electrical signals, such as current or voltage signals. The electrical signals may be amplified by an amplifier, such as a transimpedance amplifier (TIA), for subsequent processing. When the LiDAR system detects the surrounding environment, high density of the vertically emitted laser beams enables the LiDAR system to achieve high scanning resolution. One way to achieve high density of laser beams is to align a large number of laser emitters along one direction within a certain length unit on an emitter board of a transmitter of the LiDAR system. In a typical LiDAR transmitter, all emitters may be disposed on a single emitter board. Because of the physical limitation of the single emitter board, such as the limitation of the fabrication technique, vertical density for emitters on a single emitter board approaches its upper limit.

Embodiments of the present disclosure provide an improved optical signal detection system, such as a multi-beam LiDAR system, having a laser emitter array and a photodetector array. The term "array" as used herein means a group of elements forming a complete unit. The array is not limited to an orderly arrangement of such elements (e.g., laser emitters or photodetectors). The elements may be arranged in any manner as long as the same or similar purpose and result of the current disclosure are achieved. For example, the laser emitter array may have a plurality of laser emitters staggered along a vertical direction, and each laser emitter board may have a plurality of laser emitters. The photodetector array may have a plurality of columns of photodetectors, one of the plurality of columns of photodetectors may correspond to one of the plurality of laser emitter boards. Because laser emitters may be disposed on different emitter boards in a staggered fashion along the vertical direction, the density of emitters along the vertical direction can be significantly increased. Accordingly, the resolution and other related performance of the optical signal detection system may be improved.

FIG. 1 illustrates a schematic diagram of an exemplary vehicle 100 equipped with a multi-beam LiDAR optical signal detection system 102 (or multi-beam LiDAR system 102 for simplicity), according to embodiments of the disclosure. Consistent with some embodiments, vehicle 100 may be an autonomous driving vehicle or a survey vehicle configured for acquiring data for constructing a high-definition map, 3D buildings, terrestrial features, or city modeling.

As illustrated in FIG. 1, vehicle 100 may be equipped with multi-beam LiDAR system 102 mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or other suitable mounting mechanisms. Vehicle 100 may be additionally equipped with a sensor 103 inside or outside body 104 using any suitable mounting mechanisms. Sensor 103 may include sensors used in a navigation unit, such as a Global Positioning System (GPS) receiver and one or more Inertial Measurement Unit (IMU) sensors. It is contemplated that the manner in which multi-beam LiDAR system 102 or sensor 103 can be mounted on or equipped with vehicle 100 is not limited to the example shown in FIG. 1. It may be modified depending on the types of multi-beam LiDAR system 102, sensor 103, and/or vehicle 100, so that the desirable sensing performance under the present disclosure may be achieved.

Consistent with some embodiments, multi-beam LiDAR system 102 and sensor 103 may be configured to capture data as vehicle 100 moves along a trajectory. For example, a transmitter of multi-beam LiDAR system 102 is configured to scan the surrounding and acquire point clouds. Multi-beam LiDAR system 102 may include one or more LiDAR devices configured to measure distance to a target by illuminating the target with pulsed laser beams and measuring the reflected pulses with a receiver. The laser beams used by multi-beam LiDAR system 102 may be ultraviolet, visible, or near infrared. As vehicle 100 moves along the trajectory, LiDAR system 102 may continuously capture data. Each set of data captured at a certain time range is known as a data frame. Multiple data frames may be subsequently combined, with the assistance of sensor data, to construct high-definition maps.

Figure 2:
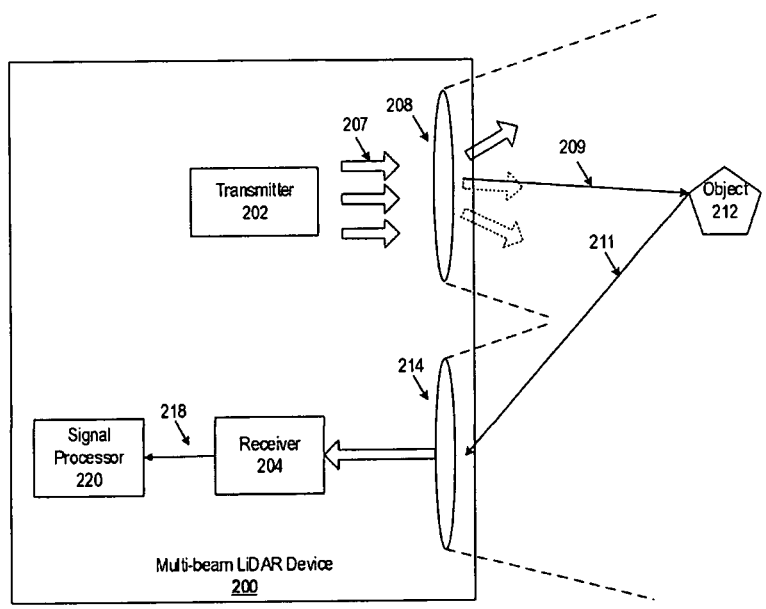
FIG. 2 illustrates a block diagram of an exemplary LiDAR device having a transmitter and a receiver, according to embodiments of the disclosure.

FIG. 2 illustrates a block diagram of an exemplary LiDAR optical signal detection device 200 (or LiDAR device 200 for simplicity), such as that used in multi-beam LiDAR system 102. Multi-beam LiDAR device 200 may include a transmitter 202 and a receiver 204. Transmitter 202 may emit laser beams within a scan angle as it moves (e.g., rotates, swings, etc.). The scan angle can be a horizontal angle, a vertical angle, or a combination of both. Transmitter 202 may include a laser source (not shown) that further includes multiple laser emitters. Each laser emitter may emit a laser beam. Thus, transmitter 202 may emit multiple laser beams 207. The multiple laser emitters may form an array of laser emitters.

In some embodiments, multi-beam LiDAR device 200 may optionally include a rotating reflection mirror (not shown). Rotating reflection mirror may be implemented by a tilting mirror, a prism, a group of mirrors, etc. Rotating reflection mirror may be provided as a component independent from, and disposed outside transmitter 202 and receiver 204. It may be driven by a rotary component that changes the direction of laser beams emitted from transmitter 202, thus creating a wider scan angle. Its rotation may further cause return beams reflected by an object in the surrounding environment to be received by receiver 204. Thus, rotating reflection mirror may replace the function of a rotating apparatus (discussed below) while not affecting the function and result of the multi-beam LiDAR device 200 according to the present disclosure. In embodiments where rotating reflection mirror is not equipped, multi-beam LiDAR device 200 can still achieve the same 360-degree rotation with the assistance of the rotating apparatus.

In some embodiments, transmitter 202 can emit multiple laser beams simultaneously within its scan angle as it moves (e.g., rotates, swings, etc.). In other embodiments, transmitter 202 can emit multiple laser beams sequentially, such as a stream of pulsed laser beams in different directions within its scan angle as it moves, as illustrated in FIG. 2.

Consistent with the embodiments of the present disclosure, the laser source may generate laser beams in the ultraviolet, visible, or near infrared wavelength range. In some embodiments, each laser emitter of the laser source may be a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments, a PLD includes a PIN diode in which the active region is in the intrinsic (I) region, and the carriers (electrons and holes) are pumped into the active region from the N and P regions, respectively. Depending on the semiconductor materials, the wavelength of incident laser beams 207 provided by a PLD may be smaller than 1,800 nm, such as 405 nm, between 445 nm and 465 nm, between 510 nm and 525 nm, 532 nm, 635 nm, between 650 nm and 660 nm, 670 nm, 760 nm, 785 nm, 808 nm, 848 nm, 905 nm, or 1550 nm. It is understood that any suitable laser emitter may be used as an emitter in the laser emitter array for emitting laser beams 207.

In some embodiments, when leaving multi-beam LiDAR device 200, one of the multiple laser beams 207, laser beam 209, may be projected to an object 212 in a first direction. Object 212 that reflects laser beam 209 may include a wide range of objects, including, for example, metallic objects, non-metallic objects, vehicles, bicycles, pedestrians, billboards, road signs, cement pavements, rocks, rain, chemical compounds, aerosols, clouds, and even single molecules. Multi-beam LiDAR device 200 may further include a transmitter optical unit 208, which may be used to collimate laser beams 207 and/or to focus laser beams for emission to the surrounding environment.

In some embodiments, receiver 204 may be configured to detect a return beam 211 that is reflected by object 212 from laser beam 209. Receiver 204 can collect return beams reflected by object 212 and output electrical signals indicating the intensity of the return beams. Although only one laser beam is shown in FIG. 2, a person of ordinary skill in the art would understand that two or more laser beams may be emitted from multi-beam LiDAR device 202, reflected by object 212, and received by receiver 204 as return beams.

As illustrated in FIG. 2, multi-beam LiDAR device 200 may include a receiver optical unit 214 and a receiver 204. Receiver optical unit 214 may be configured to collect light from all directions within its field of view (FOV). As an example, return beam 211 may be collected by receiver optical unit 214. Return beam 211 may be reflected by object 212 and have the same wavelength as laser beam 209.

Receiver 204 may include a photodetector array (not shown), which may further include a plurality of photodetectors and may be configured to detect return beam 211 reflected from object 212. In some embodiments, each of the photodetectors in the photodetector array may convert a laser light (e.g., return beam 211) collected by receiver optical unit 214 into an electrical signal 218 (e.g., a current or a voltage signal). Electrical signal 218 may be generated when photons are absorbed in a photodiode. In some embodiments of the present disclosure, the photodetectors of the photodetector array may include a PIN detector, a PIN detector array, an avalanche photodiode (APD) detector, a APD detector array, a single photon avalanche diode (SPAD) detector, a SPAD detector array, a silicon photomultiplier (SiPM/MPCC) detector, a SiP/MPCC detector array, or the like.

In some embodiments, multi-beam LiDAR device 200 may include a signal processor 220 configured to process electrical signal 218. For example, signal processor 220 may include an analog to digital converter to convert electrical signal 218 that may be an analog signal to a digital signal. In another example, signal processor 220 may include one or more filters, noise reducers, signal enhancer, or the like to improve the signal-to-noise ratio (SNR) of electrical signal 218. Signal processor 220 may include a microprocessor, a digital signal processor (DSP), a microcontroller, a field programmable gate array (FPGA), and/or other suitable devices or chips capable of processing electrical signal 218.

Figure 3:
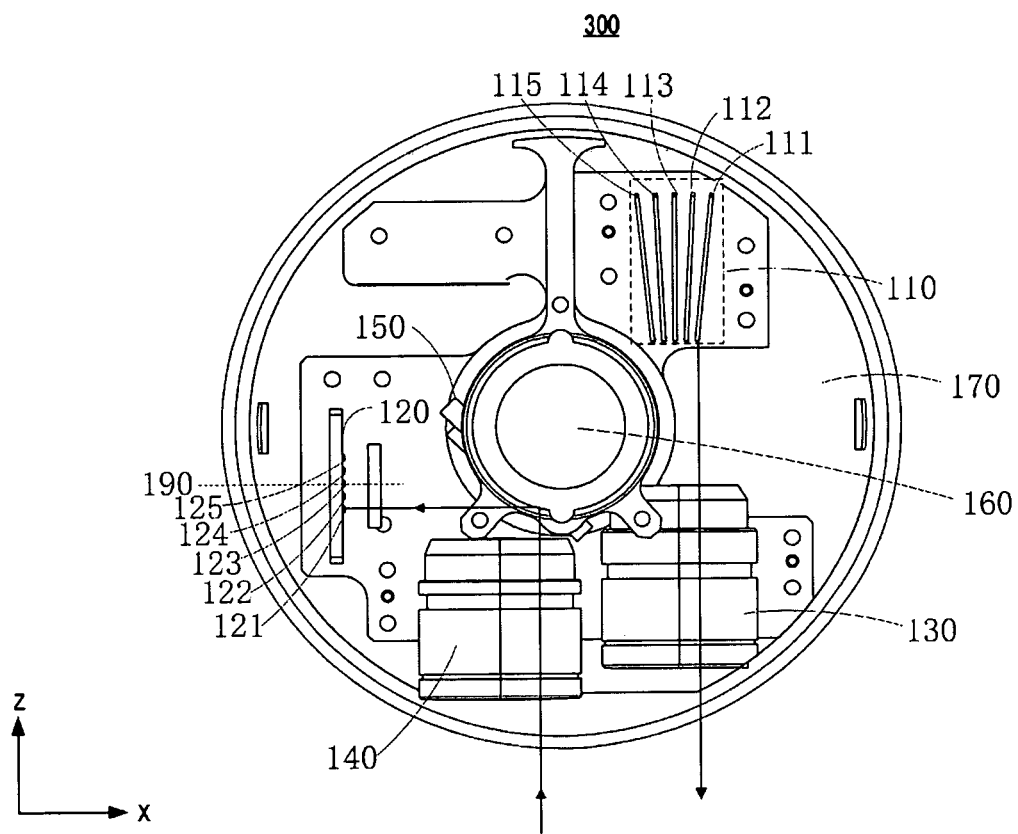
FIG. 3 illustrates a top view of an exemplary multi-beam LiDAR system, according to embodiments of the disclosure.

FIG. 3 illustrates a top view of an exemplary multi-beam LiDAR system 300, according to embodiments of the disclosure. Multi-beam LiDAR system 300 may be one implementation of, thus having the same composition and design as, multi-beam LiDAR system 200 in FIG. 2. In some embodiments, multi-beam LiDAR system 300 may include a laser emitter array 110 and a photodetector array 120.

Figure 4A:
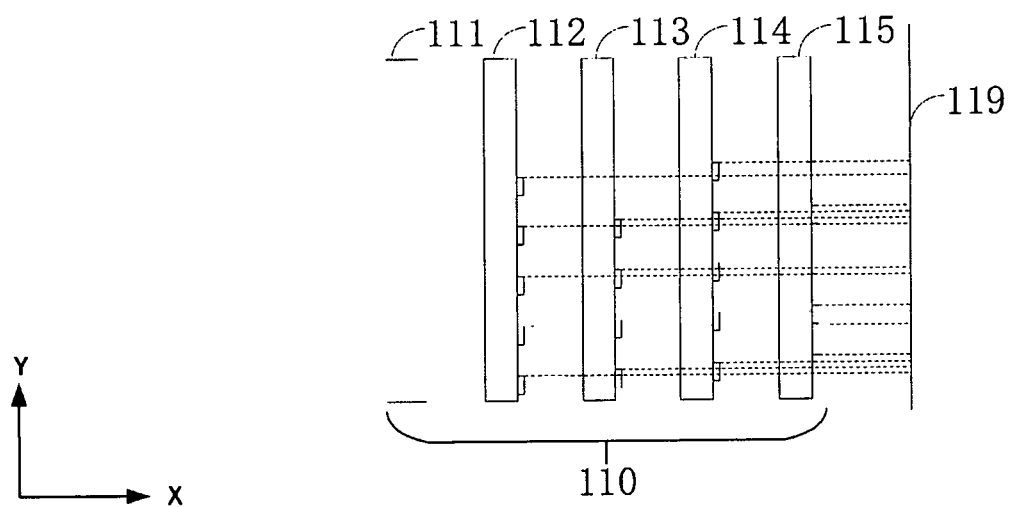
FIG. 4A illustrates a schematic diagram of an exemplary emitter laser array of the multi-beam LiDAR system, according to embodiments of the disclosure.

In some embodiments, laser emitter array 110 may include two or more laser emitter boards. In the example illustrated in FIG. 3, five laser emitter boards 111, 112, 113, 114, and 115 (hereinafter "laser emitter boards 111-115") are arranged on a horizontal plane (e.g., the plane defined by x-axis and z-axis, or simply "x-z plane"), and each laser emitter board may extend along a vertical direction (e.g., along y-axis, as shown in FIG. 4A), which is perpendicular to the horizontal plane. In some embodiments, the horizontal plane may be a plane parallel to the sea level. In other embodiments, the horizontal plane may be a plane parallel to a surface on which the vehicle mounted with multi-beam LiDAR system 300 is travelling. Each laser emitter board may include a plurality of laser emitters aligned in a vertical direction.

FIG. 4A illustrates a schematic diagram of an exemplary laser emitter array of multi-beam LiDAR system 300, according to embodiments of the disclosure. As illustrated in FIG. 4A, laser emitter array 110 may include a plurality of laser emitter boards 111-115 perpendicular to a horizontal plane. Each of laser emitter boards 111-115 may include a plurality of laser emitters staggered along the vertical direction. For example, when being projected horizontally along the x-axis onto a virtual vertical surface 119, the laser emitters on laser emitter boards 111-115 are staggered vertically on the virtual surface 119. The term "staggered" used herein means that the laser emitters on adjacent laser emitter boards have a position shift along a direction. In this example, laser emitters from adjacent laser emitter boards are not of the same vertical height along the vertically direction (e.g., y-axis direction). As a result, the laser beams emitted by the plurality of laser emitters do not coincide with each another, and the projection path of each laser emitter does not overlap with each other either. Thus, the number of laser beams per unit length along the vertical direction is increased, and therefore the density of emitted laser beams along that direction is also improved. In this way, because the laser emitters in laser emitter array 110 are staggered along a vertical direction, multi-beam LiDAR system 300 may emit laser beams of higher vertical density, thus increasing its vertical resolution and other related performances.

It is also contemplated that, in some embodiments, laser emitters in emitter array 110 may not be staggered vertically on the horizontal plane (e.g., x-z plane). For example, when multi-beam LiDAR system 300 rotates about an axis that lies within the x-z plane, laser emitters in emitter array 110 may be staggered along a horizontal direction (that is, along an axis in the x-z plane), parallel to the rotation axis of multi-beam LiDAR system 300. Accordingly, the photodetector array on the receiving side of the multi-beam LiDAR system may also need corresponding change in its configuration. A person of ordinary skill in the art, learning the staggered arrangement of laser emitters taught in the present disclosure, would know how to apply the teaching of the present disclosure to other implementations of a multi-beam LiDAR system as well.

In some embodiments, at least one of the plurality of laser emitter boards may be at an angle with another laser emitter board. When the laser emitter boards are perpendicular to a horizontal plane (e.g., the x-z plane), the angle represents the angle viewed from the vertical direction (e.g., along the y-axis). When the angle is not 0 or 180 degrees, the two laser emitter boards are not parallel to each other. In some embodiments, the non-parallel laser emitter boards are adjacent to each other. Therefore, it is contemplated that at least one of the plurality of laser emitter boards is not parallel to another laser emitter board adjacent to it.

In other embodiments, when two adjacent laser emitter boards are not parallel to each other, the other laser emitter boards may or may not be parallel between each other. In an example of six laser emitter boards, two of the laser emitter boards in the middle may form an acute angle to focus the emitted laser beams while the other four on the outer peripheral may be parallel to each other. In another example of four laser emitter boards, each pair of adjacent laser emitter boards may form an acute angle and none of the plurality of laser emitter boards is parallel to the laser emitter board adjacent to it.

Figure 4B:
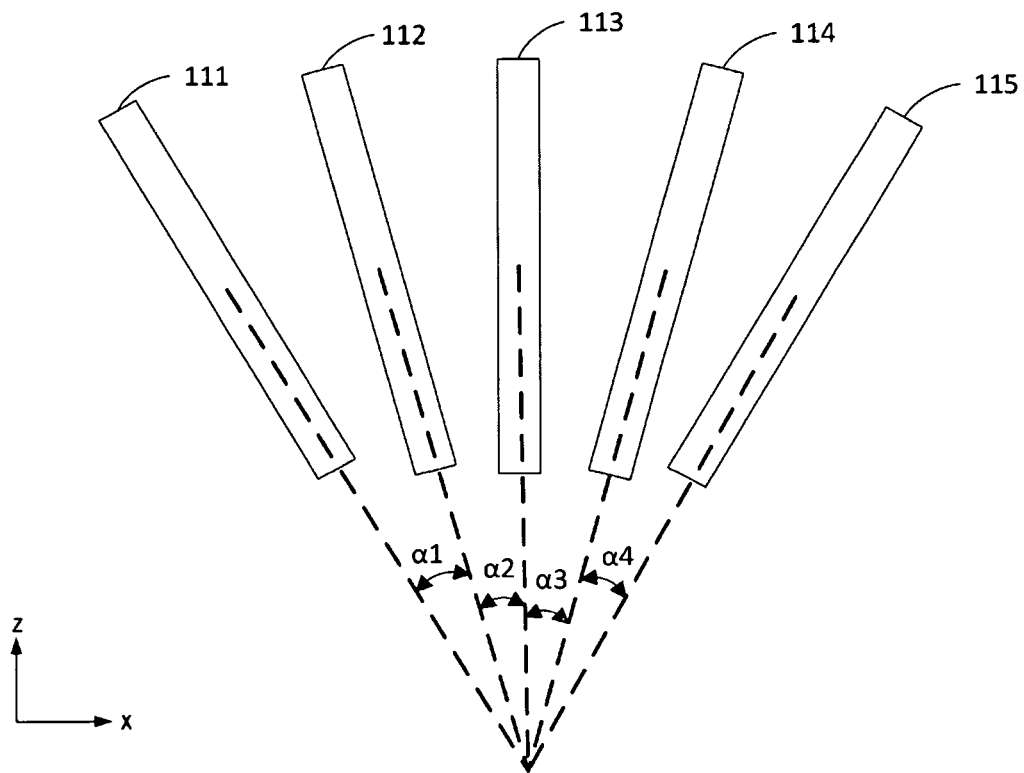
FIG. 4B illustrates a schematic diagram of an exemplary arrangement of laser emitter boards of the multi-beam LiDAR system, according to embodiments of the disclosure.

FIG. 4B illustrates a schematic diagram of an exemplary arrangement of laser emitter boards 111-115 of multi-beam LiDAR system 300. Each pair of adjacent laser emitter boards have an angle ($\alpha 1$, $\alpha 2$, $\alpha 3$, and $\alpha 4$). None of the angles is 0 degree. Thus, none of the plurality of laser emitter boards 111-115 is parallel to the laser emitter board adjacent to it. This non-parallel arrangement of laser emitter boards makes the light-emitting surface more compact, thus reducing the volume of subsequent optical components, which in turn shrink the size of the transmitter. Thus, the overall size of multi-beam LiDAR system 300 may also be reduced, as well as the manufacturing cost of multi-beam LiDAR system 300.

Consistent with the embodiments of the present disclosure, the angle between two adjacent laser emitter boards may be fixed during the manufacturing stage or preset before each use. In embodiments where the angle is preset before each use, an angle adjusting mechanism (not shown) may be provided. The angle adjusting mechanism may change the orientation of one or both of the adjacent laser emitter boards in order to obtain the desired angle for a particular application using the multi-beam LiDAR. The angle may be predetermined to be any value between 0 and 180 degrees, for example, 1 degree, 2 degrees, 5 degrees, 10 degrees, 15 degrees, etc. When N laser emitter boards are provided, there are N−1 angles between adjacent laser emitter boards (N>2). When N>3, there are two or more angles. In some embodiments, these angles may be the same. In other embodiments, at least two of them are different. Where the two or more predetermined angles are different, the angle between two laser emitter boards that are closer to the center of the laser emitter array (e.g., $\alpha 2$ or $\alpha 3$ in FIG. 4B) is smaller than the angle between two laser emitter boards that are farther away from the center of the laser emitter array (e.g., $\alpha 1$ or $\alpha 4$ in FIG. 4B). As a result, the emitted beams may have a higher concentration at or near the center portion of the emitted laser beams, thus increasing the detection accuracy and resolution around that portion.

Figure 4C:
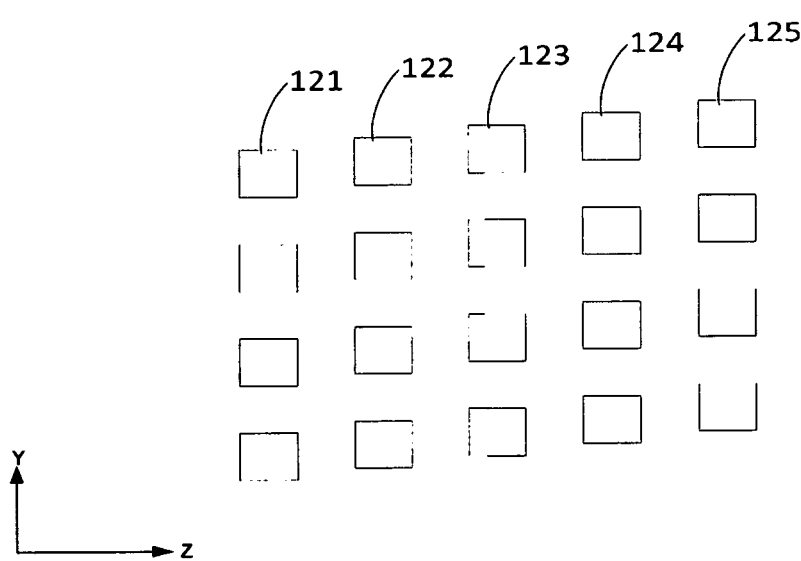
FIG. 4C illustrates a schematic diagram of an exemplary photodetector array of the multi-beam LiDAR system, according to embodiments of the disclosure.

In some embodiments, photodetector array 120 may include two or more photodetector columns. In the example illustrated in FIG. 3, five photodetector columns 121, 122, 123, 124, and 125 (hereinafter "photodetector columns 121-125") are perpendicular a horizontal plane (e.g., x-z plane), and each photodetector column may extend along a vertical direction (e.g., along y-axis, as shown in FIG. 4C), perpendicular to the horizontal plane. Each photodetector column may include a plurality of photodetectors aligned in a vertical direction.

FIG. 4C illustrates a schematic diagram of an exemplary photodetector array of multi-beam LiDAR system 300, according to embodiments of the disclosure. In some embodiments, one of photodetector columns 121-125 may correspond to one of laser emitter boards 111-115 disposed in emitter array 110. In some embodiments, one photodetector on a photodetector column may correspond to one laser emitter on a laser emitter board that corresponds to that photodetector column. For example, photodetectors in photodetector column 121 may receive the return beams that are reflected by an object from the laser beams emitted by laser emitters on laser emitter board 111, photodetectors in photodetector column 122 may receive the return beams that are reflected by an object from the laser beams emitted by laser emitter board 112, and so on. In some embodiments, photodetectors in photodetector array 120 of multi-beam LiDAR system 300 may also be staggered along the vertical direction (e.g., along y-axis), as shown in FIG. 4C. Therefore, photodetector array 120 may be able to receive a broader range of return beams in spite of the higher density of the laser beams, which are emitted by laser emitter array 110 having corresponding laser emitters staggered along the same vertical direction.

In some embodiments, photodetector array 120 may be an individual photodetector area array. In other embodiments, photodetector array 120 may be an integrated photodetector array that consists of multiple individual photodetector arrays, each of which has the similar configuration and design as the exemplary photodetector array discussed above.

It is contemplated that the number of laser emitter boards included in emitter array 110 and the number of photodetector columns included in photodetector array 120 are just for illustrative purpose and should not be limited to five. For example, laser emitter array 110 may include 2, 3, 4, 6, 7, 8, 9, 10, or more laser emitter boards, and photodetector array 120 may include 2, 3, 4, 6, 7, 8, 9, 10, or more photodetector columns. In some embodiments, one photodetector column may correspond to one laser emitter board. In other embodiments, each photodetector column may correspond to one and only one laser emitter board, and therefore the number of laser emitter boards is equal to that of photodetector columns. Such a one-to-one design of laser emitter board and photodetector column is relatively easy to be implemented and assembled thanks to its simplified configuration. In yet other embodiments, two or more photodetector columns may correspond to one laser emitter board, which may increase the detection precision of the return beams.

Similarly, the number of laser emitters in each of the laser emitter boards and the number of photodetectors in each of the photodetector columns are not limited to 4 or 5, as illustrated in FIGS. 4A and 4C. It is understood that the number of emitters in each of the laser emitter boards and the number of photodetectors in each of the photodetector columns may vary according to different performance requirements of multi-beam LiDAR system 300.

In some embodiments, multi-beam LiDAR system 300 may also include a transmitter optical unit 130 and a receiver optical unit 140. Transmitter optical unit 130 may be configured to collimate the laser beams emitted from laser emitter array 110. For example, laser beams emitted by laser emitter array 110 may be focused by transmitter optical unit 130, and thus may reduce the spread and dispersion of the emitted laser beams as the beams propagate. In some embodiments, to better collimate the emitted laser beams, a focal plane of transmitter optical unit 130 may coincide with a light-emitting surface of laser emitter array 110. The light-emitting surface of laser emitter array 110 may be a surface perpendicular to the laser beams emitted by laser emitter array 110.

In some embodiments, receiver optical unit 140 may be configured to collect laser beams reflected by the object and focus the light before it is received by photodetector array 120. The larger aperture receiver optical unit 140 has, the greater number of return beams it may collect. As a result, more return beams may be focused by receiver optical unit 140 and received by the photodetectors of photodetector array 120. In some embodiments, to better focus the return beams, a focal plane of receiver optical unit 140 may coincide with a light-receiving surface of photodetector array 120. The light-receiving surface of photodetector array 120 may be a surface perpendicular to the reflect laser beams received by the photodetectors of photodetector array 120. In some embodiments, an optical axis of transmitter optical unit 130 is parallel to an optical axis of receiver optical unit 140.

Consistent with some embodiments of the present disclosure, transmitter optical unit 130 and receiver optical unit 140 may have the same size. For example, the area of the light-emitting surface may be the same as the area of the light-receiving surface. In some other embodiments, transmitter optical unit 130 and receiver optical unit 140 may have different sizes. Preferably, receiver optical unit 140 may have a larger size than transmitter optical unit 130. For example, the area of the light-receiving surface may be larger than the area of the light-emitting surface. This configuration of size difference between two optical units may allow photodetector array 120 to capture more information of the surrounding environment, as the return beams are usually more scattered after reflection by the object in the environment than the emitted laser beams.

In some embodiments, multi-beam LiDAR device 300 may include a reflection mirror 150 disposed between receiver optical unit 140 and photodetector array 120, as illustrated in FIG. 3. In some embodiments, reflection mirror 150 may be configured to redirect the laser beams focused by receiver optical unit 140 for reception by photodetector array 120. For example, when laser beams are emitted by laser emitter array 110 and reflected by an object, receiver optical unit 140 may receive the return beams through its apertures. Reflection mirror 150 may redirect return beams focused by receiver optical unit 140 to one of the photodetector columns that corresponds to the laser emitter board that emits the laser beams. For example, laser beams emitted by laser emitter board 111 may be reflected by an object and the resulted return beams may be received by receiver optical unit 140. Reflection mirror 150 may redirect the return beams focused by receiver optical unit 140 to photodetector column 121 of photodetector array 120.

In some embodiments, a central line of laser emitter array 110 may be perpendicular to a central line of photodetector array 120. Both central lines are virtual lines that pass through laser emitter array 110 and photodetector array 120, respectively. In situations where laser emitter array 110 includes an odd number of laser emitter boards (such as 3, 5, 7 or 9), the central line of laser emitter array 110 may coincide with the line that passes through the center of the laser emitter board located in the middle of laser emitter array 110. In situations where laser emitter array 110 includes an even number of laser emitter boards (such as 2, 4, 6, 8 or 10), the central line of laser emitter array 110 may coincide with the line that lies between, and equally from, two center laser emitter boards located in the middle of laser emitter array 110. For example, the central line of laser emitter array 110 having five laser emitter boards may coincide with the line that passes through the center of the third laser emitter board counted from the left (or right) of laser emitter array 110. In some embodiments, a central line of photodetector array 120 may be a virtual line 190 that is perpendicular to a surface of a circuit on which photodetector array 120 are arranged.

In some embodiments, multi-beam LiDAR system 300 may include a stationary part 160, a rotating part 170, and a rotating apparatus (not shown in FIG. 3). Stationary part 160 may be connected to rotating part 170 through the rotating apparatus. In some embodiments, the rotating apparatus may use a communication module to communicate with rotating part 170. The communication module may have two different implementations. One is to use a wired connection, such as slip rings. The other is to use a wireless connection, such as using electrical or magnetic signals to establish connections through electromagnetic coupling, to connect rotating apparatus with rotating part 170. The rotating apparatus may thus drive the rotation of rotating part 170.

In some embodiments, rotating part 170 rotates about an axis perpendicular to the horizontal plane (e.g., x-z plane). In some embodiments, laser emitter array 110, photodetector array 120, transmitter optical unit 130, receiver optical unit 140, and reflection mirror 150 may all be disposed in rotating part 170. Thus, when rotating part 170 rotates, these components rotate together, which may allow multi-beam LiDAR system 300 to perform a 360-degree detection of the surrounding environment.

As its name suggests, stationary part 160 does not rotate together with rotating party 170. In some embodiments, stationary part 160 may include a base and a rotating shaft (not shown in FIG. 3).

Figure 5:
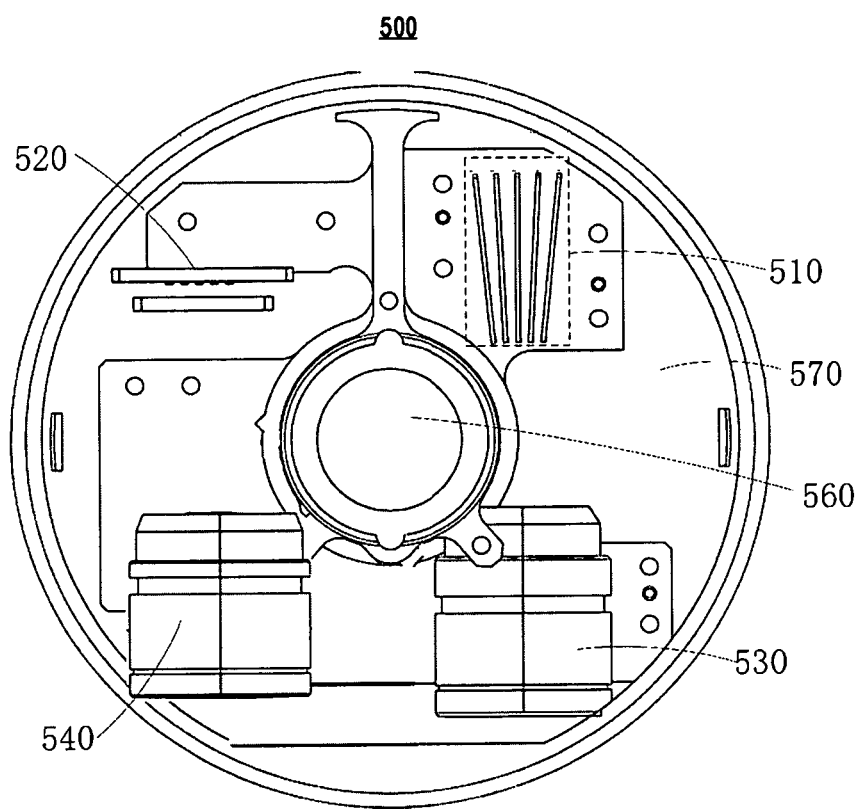
FIG. 5 illustrates a top view of another exemplary multi-beam LiDAR system, according to embodiments of the disclosure.

FIG. 5 illustrates a top view of another exemplary multi-beam LiDAR system 500, according to embodiments of the disclosure. In these embodiments, multi-beam LiDAR system 500 may include a laser emitter array 510, a photodetector array 520, a transmitter optical unit 530, and a receiver optical unit 540. Laser emitter array 510, photodetector array 520, transmitter optical unit 530, and receiver optical unit 540 may have the same or similar function and configuration as laser emitter array 110, photodetector array 120, transmitter optical unit 130, and receiver optical unit 140, respectively, which are described in detail in conjunction with FIG. 3.

Consistent with the embodiments of the present disclosure, multi-beam LiDAR system 500 may also include a stationary part 560 and a rotating part 570, which have the same or similar function and configuration as stationary part 160 and rotating part 170, respectively, which are also described in detail in conjunction with FIG. 3. Likewise, similar to the embodiments of multi-beam LiDAR system 300, laser emitter array 510, photodetector array 520, transmitter optical unit 530, and receiver optical unit 540 may all be disposed in rotating part 570. Thus, when rotating part 570 rotates, these components rotate together, which may allow multi-beam LiDAR system 500 to perform a 360-degree detection of the surrounding environment. Therefore, the same or similar function and configuration of these components will not be repeated here.

Different from multi-beam LiDAR system 300 illustrated in FIG. 3, the central line of laser emitter array 510 of multi-beam LiDAR system 500 is parallel to the central line of photodetector array 520. In these embodiments, multi-beam LiDAR system 500 does not need a reflection mirror to redirect the return beams focused by receiver optical unit 540. Return beams may directly project on the photodetectors of photodetector array 520 after passing through receiver optical unit 540. While achieving the same purpose of improving resolution of the multi-beam LiDAR as the embodiments above, this mirror-less configuration may have the benefit of reduced size and complexity of the multi-beam LiDAR, thus making it easy to install and maintain. It may also reduce the cost of producing the multi-beam LiDAR because of the lack of the additional component (i.e. reflection mirror).

Figure 6:
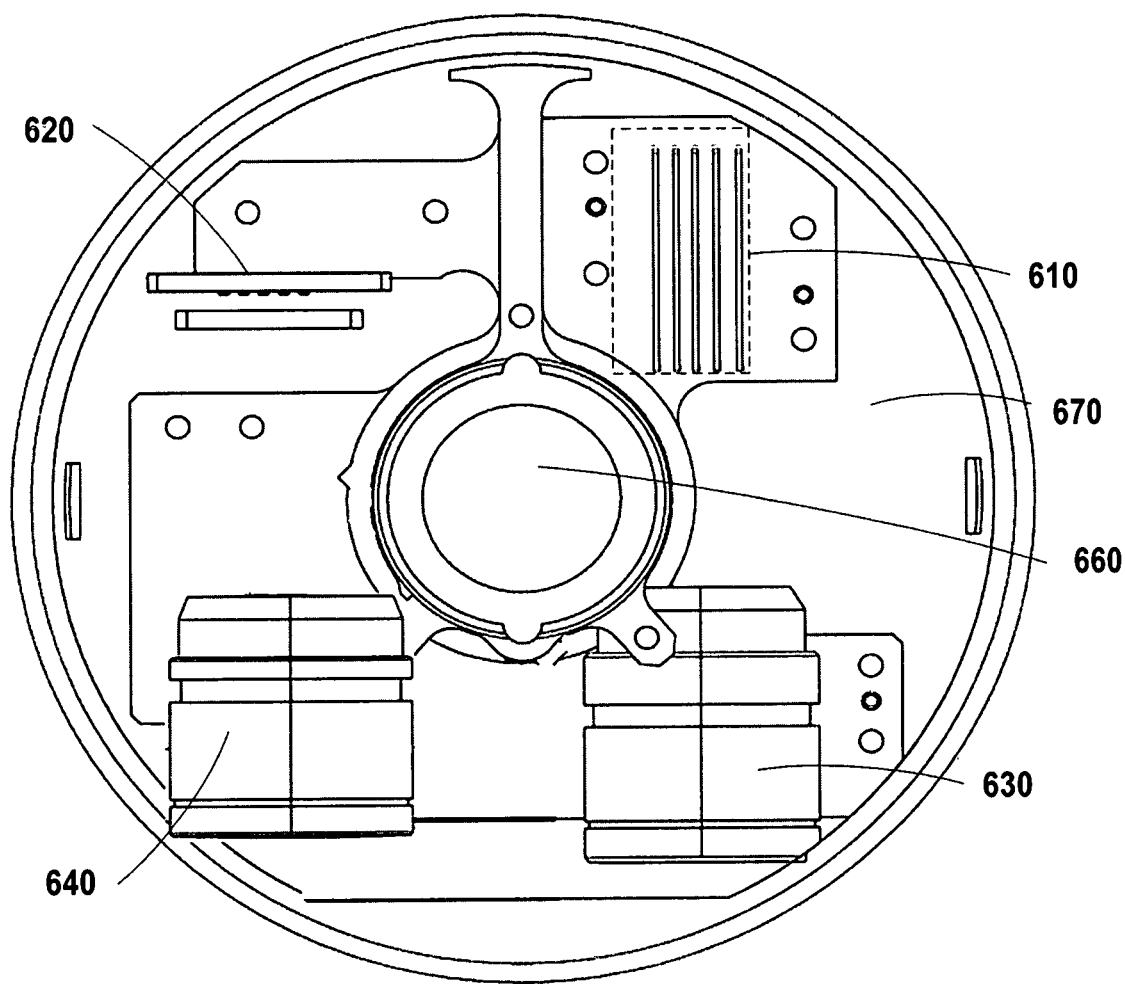
FIG. 6 illustrates a top view of yet another exemplary multi-beam LiDAR system, according to embodiments of the disclosure.

FIG. 6 illustrates a top view of another exemplary multi-beam LiDAR, according to embodiments of the disclosure. In this exemplary multi-beam LiDAR system 600, the plurality of laser emitter boards of its laser emitter array may be parallel among each other. As illustrated in FIG. 6, multi-beam LiDAR system 600 may include a laser emitter array 610, a photodetector array 620, a transmitter optical unit 630, and a receiver optical unit 640. Laser emitter array 610, photodetector array 620, transmitter optical unit 630, and receiver optical unit 640 may have the same or similar function and configuration as laser emitter array 510, photodetector array 520, transmitter optical unit 530, and receiver optical unit 540, respectively, which are described in detail in conjunction with FIG. 5. Multi-beam LiDAR system 600 may also include a stationary part 660 and a rotating part 670, which may have the same or similar function and configuration as stationary part 560 and rotating part 570, respectively, which are also described in detail in conjunction with FIG. 5. Likewise, similar to the embodiments of multi-beam LiDAR system 500, laser emitter array 610, photodetector array 620, transmitter optical unit 630, and receiver optical unit 640 may all be disposed in rotating part 670. Thus, when rotating part 670 rotates, these components rotate together, which may allow multi-beam LiDAR system 600 to perform a 360-degree detection of the surrounding environment. Therefore, the same or similar function and configuration of these components will not be repeated here.

Different from multi-beam LiDAR systems 300 or 500, the plurality of laser emitter boards of laser emitter array 610 in multi-beam LiDAR system 600 may be parallel among each other. This may allow laser emitter array 610 to emit telecentric laser beams, since the laser beams emitted from the parallel laser emitter boards are parallel to each other. This may have the benefit of reducing the size of multi-beam LiDAR system 600, particularly of the portion that houses laser emitter array 610, as parallel laser emitter boards do not have a fan-shaped rear end that occupies additional space. Parallel laser emitter boards are also easy to be installed and adjusted. Furthermore, the cloud data obtained from laser beams emitted by parallel laser emitter boards are also more uniform than non-parallel laser emitter boards.

In some embodiments, the multi-beam LiDAR in the embodiments disclosed herein may further include a processor (not shown) configured to control a time point and a light path of each of the laser emitter within the laser emitter array. The processor may also control the rotating speed and the rotation range of the rotating part to create a field of view covering surrounding environment of the multi-beam LiDAR system. The processor may include a microprocessor, a digital signal processor (DSP), a microcontroller, a field programmable gate array (FPGA), and/or other suitable devices or chips capable of achieving the same or similar result.

Figure 7:
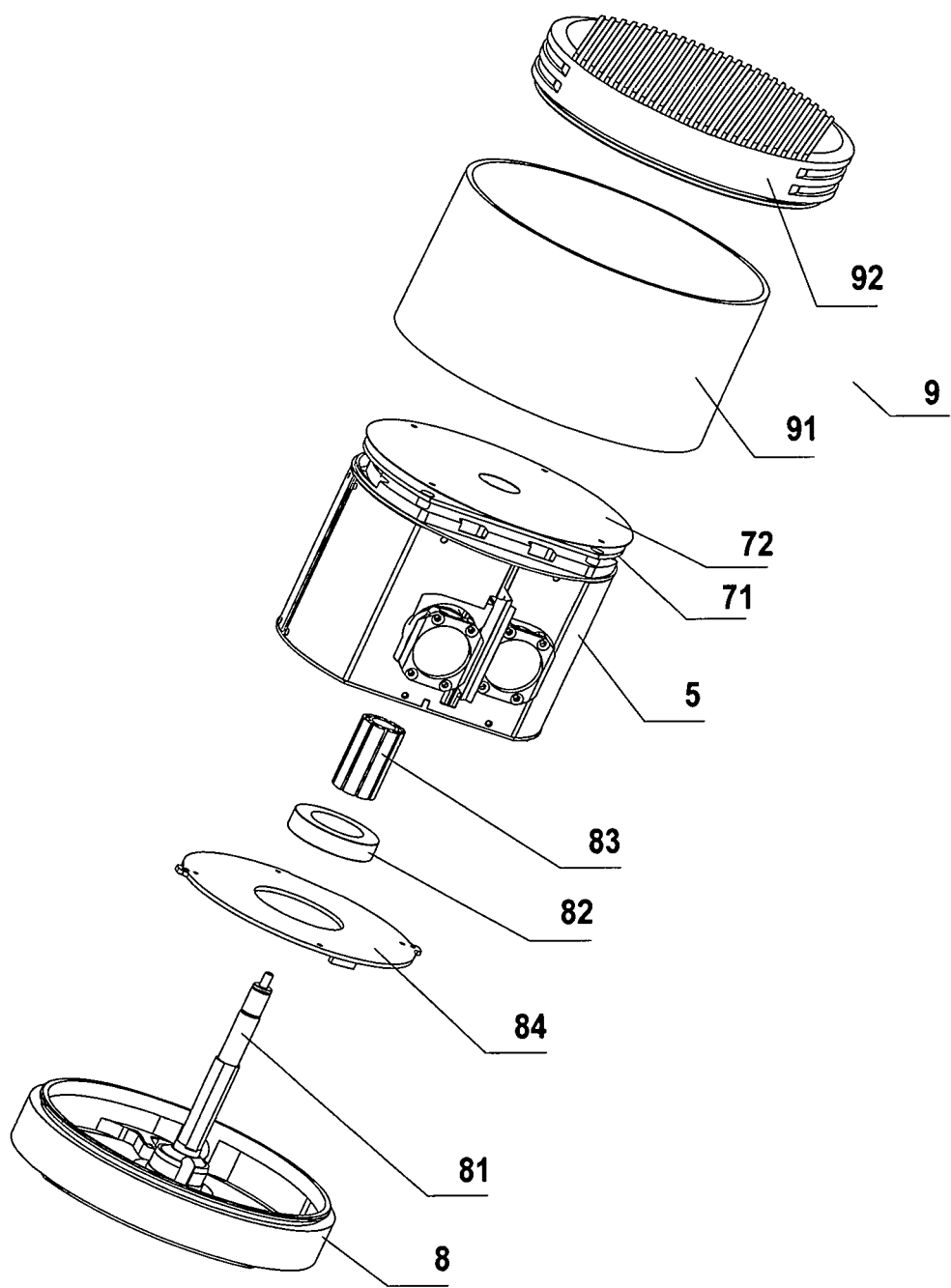
FIG. 7 illustrates an explosive view of an exemplary multi-beam LiDAR system, according to embodiments of the disclosure.
Figure 8:
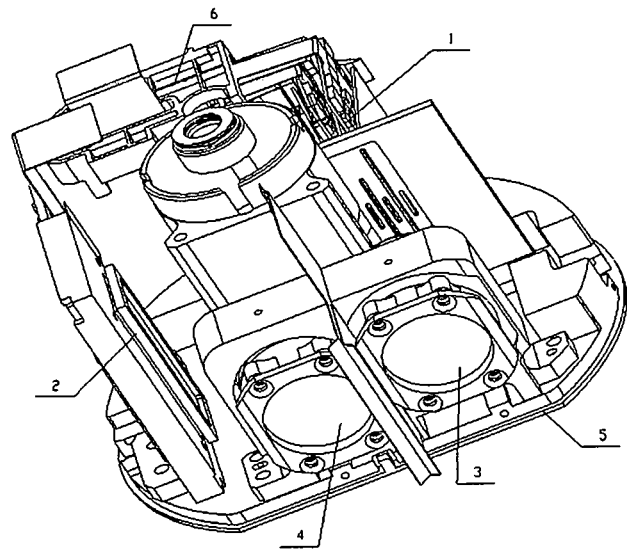
FIG. 8 illustrates a schematic diagram of an exemplary multi-beam LiDAR system, according to embodiments of the disclosure
Figure 9:
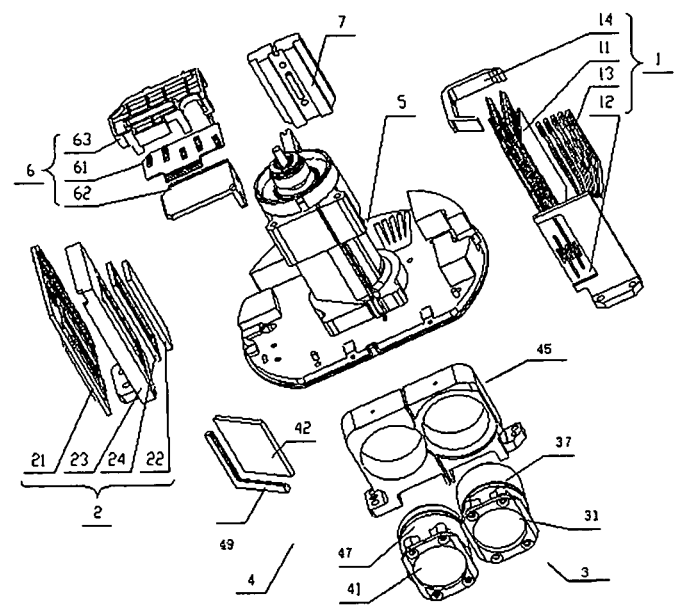
FIG. 9 illustrates an explosive view of an exemplary multi-beam LiDAR system, according to embodiments of the disclosure

FIGS. 7-9 illustrates an internal configuration of an exemplary multi-beam LiDAR system, according to embodiments of the disclosure. In some embodiments, the multi-beam LiDAR system may include a transmitter 1, a receiver 2, a transmitter optical unit 3, and a receiver optical unit 4. Transmitter 1 may be configured to emit multiple laser beams to detect objects within surrounding environment. Receiver 2 may be configured to receive laser beams reflected by the object and convert the light signals to electrical signals. Transmitter 1 may include the same laser emitter array as disclosed in conjunction with any one of FIG. 3, 5, or 6. Receiver 2 may include the same photodetector array as disclosed in conjunction with any one of FIG. 3, 5, or 6. Transmitter optical unit 3 may be configured to collimate the emitted laser beams for better scanning performance. Receiver optical unit 4 may be configured to receive the return beams and focus the received laser beams before they reach receiver 2. In some embodiments, a center line of transmitter 1 may be collinear to a center line of transmitter optical unit 3.

In some embodiments, transmitter 1 may be disposed on the rear part of one side of the multi-beam LiDAR system, facing towards the front part of the multi-beam LiDAR and aligning with transmitter optical unit 3. Receiver 2 may be disposed on a lateral part of the other side of the multi-beam LiDAR system, facing towards a center of the multi-beam LiDAR and aligning with the receiver optical unit. Consistent with the embodiments disclosed above and as illustrated in FIGS. 7 and 8, transmitter 1, receiver 2, transmitter optical unit 3, and receiver optical unit 4 may all be disposed in a rotating system 5. In some embodiments, rotating system 5 rotates about a rotating shaft 81. Rotating shaft 81 may be fixed to a base 8 of the multi-beam LiDAR system. In some preferred embodiments, rotating shaft 81 may be fixed to the center of base 8.

In some embodiments, the multi-beam LiDAR system may further include a shell 9. Shell 9 may include a protector 91 and a cover 92. In some embodiments, rotating system 5 is disposed in a cavity encompassed by shell 9 and base 8. A circuit board 84 may be fixed to base 8. Rotating shaft 81 may include a bearing 82 configured to support rotating system 5, and a motor 83 configured to rotate rotating system 5. Motor 83 may include a rotor and a stator. The stator may be fixed onto rotating shaft 81 and the rotor may be fixed to rotating system 5.

A main circuit board 71 may be disposed on the top of rotating system 5. Main circuit board 71 may be fixed to rotating system 5 via a top plate 72. Main circuit board 71 may be configured to transmit, generate, or store control signals and/or received signals. It may also be configured to process the received signals, such as converting the light signals into electrical signals, amplifying the electrical signals, and converting the electrical signals into point cloud data. In some embodiments, main circuit board 71 may be configured to only temporarily store the data, and the data may be transmitted to a server or another processor for further processing.

As illustrated in FIG. 9, in some embodiments, transmitter 1 may include one or more laser emitter boards 11. Laser emitter boards 11 may be fixed by a support frame 14 and a light adjusting frame 13. Consistent with embodiments disclosed herein, each of the plurality of laser emitter boards 11 may include multiple emitters. Laser emitter boards 11 may be fixed to rotating system 5 through light adjusting frame 13. The top part of laser emitter boards 11 may be fixed by support frame 14. In some embodiments, two or more laser emitter boards 11 may be parallel to each other. In other embodiments, a first laser emitter board is at an angle α (such as an angle α less than 90 degrees) with a second laser emitter board adjacent to the first laser emitter board.

Consistent with the embodiments of the present disclosure, transmitter 1 may further include a grating 12. Grating 12 may be configured to reduce or eliminate the interference between the emitted laser beams, thus increasing the precision and accuracy of detection by the multi-beam LiDAR system.

In some embodiments, receiver 2 may include one or more receiving boards 21 and a filter 22. Receiving boards 21 may be fixed by a receiving board seat 23. Filter 22 may be disposed in front of receiving boards 21 and fixed to receiving board seat 23 by a filter frame 24.

In some embodiments, receiver optical unit 4 includes a receiving lens set 41 and an optional reflection mirror 42. Reflection mirror may be fixed by a mirror support frame 49. Reflection mirror 42 may be configured to redirect the laser beams received by receiving lens set 41 to the photodetector array of receiver 2. When reflection mirror 42 is present, the photodetector array may be disposed on a lateral part of the receiver side of the multi-beam LiDAR system. When reflection mirror 42 is not equipped, the photodetector array may be disposed on a rear part of the receiver side of the multi-beam LiDAR system. In some embodiments, receiving lens set 41 may include a plurality of lenses housed in a receiving lens barrel 47. Transmitter optical unit 3 may include a transmitting lens set 31, which may include a plurality of lenses housed in a transmitting lens barrel 37. Receiving lens barrel 47 and transmitting lens barrel 37 may both be fixed to a lens barrel base 45.

In some embodiments, the multi-beam LiDAR system may further include an adapter system 6. Adapter system 6 may include an adapter board 61, an adapter seat 62, and a block 63. Adapter board 61 may connect main circuit board 71 with laser emitter boards 11 and receiving boards 21 for signal transmission. Adapter board 61 may be fixed to rotating system 5 via adapter seat 62. Block 63 may be mounted on top of adapter board 61 and installed to adapter seat 62 via a buckle in order to firmly press the data cables on adapter board 61 and prevent them from getting loose while being rotated.

In some embodiments, the multi-beam LiDAR system may further include a balance system 7. Balance system 7 may be a weight configured to adjust the center of gravity of rotating system 5. This may cause the center of gravity of rotating system 5 to fall on rotating shaft 81 so that the rotation is ensured to be smooth.

Figure 10:
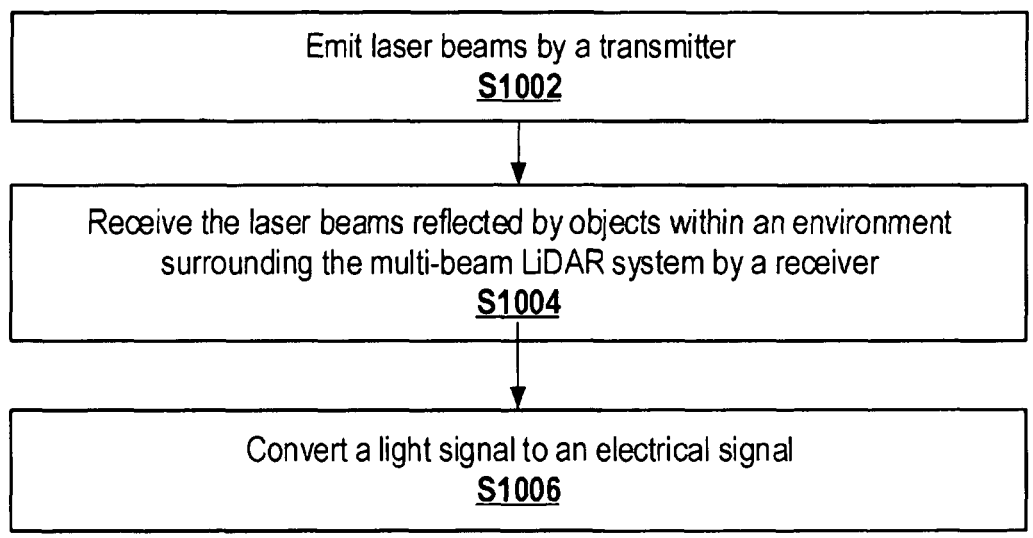
FIG. 10 illustrates a flow chart of an exemplary method for detection using the multi-beam LiDAR system, according to embodiments of the disclosure.

FIG. 10 illustrates a flow chart of an exemplary method for detection by a multi-beam LiDAR system, according to embodiments of the disclosure. In some embodiments, method 1000 may be implemented by a multi-beam LiDAR system disclosed herein, which includes a processor that performs various operations. It is to be appreciated that some of the steps may be optional to perform the disclosure provided herein, and that some steps may be inserted in the flowchart of method 1000 that are consistent with other embodiments according to the current disclosure. Further, some of the steps may be performed simultaneously, or in an order different from that shown in FIG. 10.

At step S1002, laser beams are emitted by a transmitter. In some embodiments, the transmitter may include a laser emitter array that has the same or similar function and configuration as any laser emitter array disclosed herein. In some embodiments, one of the plurality of laser emitter boards may be at an angle with another laser emitter board. When the angle is not 0 or 180 degrees, the two laser emitter boards are not parallel to each other. In some other embodiments, at least one of the plurality of laser emitter boards may be parallel to another laser emitter board adjacent to the first laser emitter board.

At step S1004, return beams that are reflected by objects from laser beams emitted from the laser emitter boards are received by receiver 2. In some embodiments, receiver 2 may include a photodetector array that has the same or similar function and configuration as any photodetector array disclosed herein. In some embodiments, one photodetector column of the photodetector array of receiver 2 may correspond to one laser emitter board of the laser emitter array of transmitter 1, and each photodetector within the photodetector column corresponds to a laser emitter disposed on the corresponding laser emitter board.

At step S1006, light signals embodied in the return beams may be converted into electrical signals (e.g., current signals or voltage signals) by a processor. The converted electrical signals may be amplified by an amplifier (e.g., a transimpedance amplifier) and may further be processed to generate data, such as point clouds.

It will be apparent to those skilled in the art that various modifications and variations can be made to the disclosed systems and related methods. Other embodiments will be apparent to those skilled in the art from consideration of the specification and practice of the disclosed systems and related methods.

It is intended that the specification and examples be considered as exemplary only, with a true scope being indicated by the following claims and their equivalents.

What is claimed is:

1. A multi-beam LiDAR system, comprising:
a transmitter having an array of laser emitters, each laser emitter being configured to emit at least one laser beam; and
a receiver having an array of photodetectors, each photodetector being configured to receive at least one return beam that is reflected by an object from one laser beam emitted by the array of laser emitters,
wherein the laser emitter array comprises a plurality of laser emitter boards perpendicular to a horizontal plane, each laser emitter board having a plurality of laser emitters, wherein the plurality of laser emitters in the laser emitter array are staggered along a vertical direction, and wherein the photodetector array comprises a plurality of columns of photodetectors, one of the plurality of laser emitter boards corresponding to one of the plurality of columns of photodetectors,
wherein at least one of the plurality of laser emitter boards is not parallel to another laser emitter board adjacent to the one laser emitter board, wherein each adjacent pair of laser emitter boards of the plurality of laser emitter boards comprises two laser emitter boards that are not parallel to one another, wherein any two adjacent laser emitter boards of the plurality of laser emitter boards are at a predetermined angle, wherein, there are two or more predetermined angles between adjacent pairs of the plurality of laser emitter boards, at least two of the two or more predetermined angles are different from each other, wherein the predetermined angle between two laser emitter boards that are closer to the center of the laser emitter array is smaller than the predetermined angle between two laser emitter boards that are farther away from the center of the laser emitter array; and wherein each column of photodetectors receive the return beams that are reflected from the laser beams emitted from a laser emitter board corresponding to the column.

2. The multi-beam LiDAR system of claim 1, further comprising:

a transmitter optical unit configured to collimate the laser beams emitted from the laser emitter array, wherein a focal plane of the transmitter optical unit coincides with a light-emitting surface of the laser emitter array; and a receiver optical unit configured to focus the return beams reflected by the object, wherein a focal plane of the receiver optical unit coincides with a light-receiving surface of the photodetector array, wherein an optical axis of the transmitter optical unit is parallel to an optical axis of the receiver optical unit.

3. The multi-beam LiDAR system of claim 1, wherein a central line of the laser emitter array is parallel to a central line of the photodetector array.

4. The multi-beam LiDAR system of claim 2, further comprising a reflection mirror disposed between the receiver optical unit and the photodetector array, wherein the reflection mirror is configured to redirect the return beams focused by the receiver optical unit for reception by the photodetector array.

5. The multi-beam LiDAR system of claim 4, wherein a central line of the laser emitter array is perpendicular to a central line of the photodetector array.

6. The multi-beam LiDAR system of claim 4, wherein the laser emitter array is disposed on a rear part of one side of the multi-beam LiDAR system, facing towards the front part of the multi-beam LiDAR system and aligning with the transmitter optical unit, and wherein the photodetector array is disposed on a lateral part of the other side of the multi-beam LiDAR system, facing towards a center of the multi-beam LiDAR system and aligning with the receiver optical unit.

7. The multi-beam LiDAR system of claim 1, wherein the transmitter further comprises a grating disposed in front of the plurality of laser emitter boards, and wherein the plurality of laser emitter boards are fixed to the multi-beam LiDAR system by a light adjusting frame and a support frame.

8. The multi-beam LiDAR system of claim 1, wherein, if there are two or more predetermined angles, the two or more predetermined angles are the same.

9. The multi-beam LiDAR system of claim 1, wherein the receiver further comprises a receiving board and a filter, wherein the receiving board is fixed to the multi-beam LiDAR system by a receiving board seat, and wherein the filter is disposed in front of the receiving board and is fixed to the receiving board seat by a filter frame.

10. The multi-beam LiDAR system of claim 2, wherein the receiver optical unit further comprises a receiving lens set, wherein the receiving lens set comprises a plurality of lenses housed in a receiving lens barrel.

11. The multi-beam LiDAR system of claim 2, wherein the transmitter optical unit comprises a plurality of lenses housed in a transmitting lens barrel.

12. The multi-beam LiDAR system of claim 2, wherein the size of the receiver optical unit may be larger than the size of the transmitter optical unit.

13. The multi-beam LiDAR system of claim 1, further comprising:

a rotating reflection mirror configured to change the direction of laser beams emitted from the laser emitter array, wherein the rotating reflection mirror is disposed outside the transmitter and the receiver.

14. A multi-beam LiDAR system, comprising:

a transmitter having an array of laser emitters, each laser emitter being configured to emit a laser beam;

a receiver having an array of photodetectors, each photodetector being configured to receive at least one return beam that is reflected by an object from one of the laser beams; and a reflection mirror disposed between a receiver optical unit of the receiver and the photodetector array, wherein the laser emitter array comprises a plurality of laser emitter boards perpendicular to a horizontal plane, each laser emitter board having a plurality of laser emitters, wherein the plurality of laser emitters in the laser emitter array are staggered along a vertical direction, wherein the photodetector array comprises a plurality of columns of photodetectors, one of the plurality of laser emitter boards corresponding to one of the plurality of columns of photodetectors, wherein the reflection mirror is configured to redirect the return beams focused by the receiver optical unit for reception by the photodetector array, wherein the laser emitter array is disposed on a rear part of one side of the multi-beam LiDAR system, facing towards the front part of the multi-beam LiDAR system and aligning with the transmitter optical unit, and wherein the photodetector array is disposed on a lateral part of the other side of the multi-beam LiDAR system, facing towards a center of the multi-beam LiDAR system and aligning with the receiver optical unit.

15. The multi-beam LiDAR system of claim 14, wherein each column of photodetectors receive the return beams that are reflected from the laser beams emitted from a laser emitter board corresponding to the column.

16. The multi-beam LiDAR system of claim 14, wherein at least one of the plurality of laser emitter boards is not parallel to another laser emitter board adjacent to the one laser emitter board.

17. The multi-beam LiDAR system of claim 16, wherein none of the plurality of laser emitter boards is parallel to the laser emitter board adjacent to it.

18. The multi-beam LiDAR system of claim 14, wherein the plurality of laser emitter boards are parallel among each other.

19. The multi-beam LiDAR system of claim 14, wherein the transmitter further comprises a grating disposed in front of the plurality of laser emitter boards, and
wherein the plurality of laser emitter boards are fixed to the multi-beam LiDAR system by a light adjusting frame and a support frame.

\* \* \* \* \*